US012560266B2

(12) United States Patent
Kumashiro et al.

(10) Patent No.: US 12,560,266 B2
(45) Date of Patent: Feb. 24, 2026

(54) CIRCULATING CIRCUIT MEMBER, AND MANUFACTURING METHOD FOR CIRCULATING CIRCUIT MEMBER

(71) Applicant: NIPPON THERMOSTAT CO., LTD., Kiyose (JP)

(72) Inventors: Tsuyoshi Kumashiro, Kiyose (JP); Junichi Sato, Kiyose (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 18/697,898

(22) PCT Filed: Oct. 5, 2022

(86) PCT No.: PCT/JP2022/037233
§ 371 (c)(1),
(2) Date: Apr. 2, 2024

(87) PCT Pub. No.: WO2023/074287
PCT Pub. Date: May 4, 2023

(65) Prior Publication Data
US 2025/0012391 A1 Jan. 9, 2025

(30) Foreign Application Priority Data
Nov. 1, 2021 (JP) ................................. 2021-178935

(51) Int. Cl.
*F16L 37/252* (2006.01)
*F16L 37/248* (2006.01)

(52) U.S. Cl.
CPC ........... *F16L 37/252* (2013.01); *F16L 37/248* (2013.01)

(58) Field of Classification Search
CPC ... F16L 37/248; F16L 2201/10; F16L 37/252; F16L 37/107; F16L 37/113; B29C 33/0033; F01P 7/16; G05D 23/134
(Continued)

(56) References Cited

U.S. PATENT DOCUMENTS 69,706 A * 10/1867 Roberts ................. F16L 37/248
285/377
3,152,654 A * 10/1964 Conover ............... E21B 10/633
175/413
(Continued)

FOREIGN PATENT DOCUMENTS

CN 209688311 U 11/2019
JP S52-075112 U 6/1977
(Continued)

OTHER PUBLICATIONS

The English translation of the PCT/ISA/210 from PCT/JP2022/037233.

*Primary Examiner* — David Bochna
(74) *Attorney, Agent, or Firm* — Carrier, Shende & Associates P.C.; Fulchand P. Shende; Joseph P. Carrier

(57) ABSTRACT

A circulating circuit member 1 forms a part of a circulating circuit through which a fluid flows. The circulating circuit member 1 includes a pipe 4; a to-be attached member that has a sleeve portion 3 made of synthetic resin to which the pipe 4 is rotationally connected; and a pin 6 that is inserted from the sleeve portion 3 to the pipe 4, in which a pin insertion hole 5 of the sleeve portion 3 through which the pin 6 is inserted is formed by a mold that is pulled out from an inside of the sleeve portion 3.

6 Claims, 7 Drawing Sheets

(58) Field of Classification Search
USPC ................................................ 285/91, 404
See application file for complete search history.

(56) References Cited

U.S. PATENT DOCUMENTS

| | | | | |
|---|---|---|---|---|
| 3,183,024 A * | 5/1965 | Myers | ...................... | F42B 15/36 |
| | | | | 285/332 |
| 3,260,319 A * | 7/1966 | Conover | ............... | E21B 10/633 |
| | | | | 285/91 |
| 3,995,889 A * | 12/1976 | Carr | ...................... | F16L 37/252 |
| | | | | 285/91 |
| 4,193,542 A | 3/1980 | Knauss | | |
| 4,479,669 A * | 10/1984 | Hynes | ................... | E21B 17/046 |
| | | | | 285/332.3 |
| 4,907,828 A * | 3/1990 | Chang | .................... | F16L 15/08 |
| | | | | 285/24 |
| 5,975,116 A * | 11/1999 | Rosas | .................... | F16K 17/36 |
| | | | | 285/402 |
| 6,092,844 A * | 7/2000 | Lee | ....................... | F16L 37/252 |
| | | | | 285/179 |
| 6,409,221 B1 * | 6/2002 | Robinson | ............... | F16L 37/24 |
| | | | | 285/91 |
| 7,389,833 B2 * | 6/2008 | Walker | ................... | E21B 10/36 |
| | | | | 175/413 |
| 8,360,088 B2 * | 1/2013 | Nishi | ................... | F16K 24/044 |
| | | | | 137/202 |
| 10,513,966 B2 | 12/2019 | Suzuki et al. | | |
| 11,149,627 B2 | 10/2021 | Sano | | |
| 12,092,014 B2 * | 9/2024 | Kumashiro | ............... | F01P 7/16 |
| 12,173,639 B2 * | 12/2024 | Kumashiro | .......... | F16K 31/002 |
| 2003/0214134 A1 | 11/2003 | Allouche | | |
| 2006/0207656 A1 | 9/2006 | Takahashi | | |
| 2011/0127769 A1 | 6/2011 | Medina | | |
| 2016/0169432 A1 * | 6/2016 | Proulx-Croteau | .... | F16L 37/252 |
| | | | | 285/307 |
| 2023/0056893 A1 * | 2/2023 | Ramaswamy | ........ | F16B 31/024 |
| 2024/0226786 A1 * | 7/2024 | Hamkens | ............... | B01D 29/23 |

FOREIGN PATENT DOCUMENTS

| | | | | | |
|---|---|---|---|---|---|
| JP | S53-76429 A | 7/1978 | | | |
| JP | S54-064867 U | 5/1979 | | | |
| JP | H60-016009 U | 2/1985 | | | |
| JP | H06-229492 A | 8/1994 | | | |
| JP | 2003222264 A | * | 8/2003 | .......... | G05D 23/022 |
| JP | 2006-258145 A | 9/2006 | | | |
| JP | 2010-076280 A | 4/2010 | | | |
| JP | 2012-082881 A | 4/2012 | | | |
| JP | 2017-133547 A | 8/2017 | | | |
| JP | 2020-128711 A | 8/2020 | | | |

* cited by examiner

TIP SIDE

BASE END SIDE

CIRCULATING CIRCUIT MEMBER, AND MANUFACTURING METHOD FOR CIRCULATING CIRCUIT MEMBER

TECHNICAL FIELD

The present invention relates to a circulating circuit member and a manufacturing method for a circulating circuit member.

BACKGROUND ART

A pipe that forms a part of a circulating circuit that circulates a cooling/warming fluid (gas/liquid) is connected to, for example, a to-be attached member such as a valve device and the like that controls a flow of the fluid. For example, the pipe of Japanese Patent Application Laid-Open No. 2017-133547 is connected to the valve device by welding, and the pipe of Japanese Patent Application Laid-Open No. 2020-128711 is connected to the valve device by bolt. In addition, as a joining method for pipes, in addition to welding and bolting, a method for rotational connection such as screwing or bayonet-coupling (for example, Japanese Patent Application Laid-Open No. S53-076429), and the like is known.

SUMMARY OF INVENTION

Technical Problem

It takes time and effort to connect a pipe constituting a part of the circulating circuit and the to-be attached member by welding or bolting as in the related art. On the other hand, in a case where the pipe and the to-be attached member are rotationally connected such as screwing or bayonet-coupling, and the like, the connection is easy. However, in this case, it may be difficult to design the to-be attached member. The reason will be described below.

In a case where the pipe and the to-be attached member are rotationally connected, a sleeve portion is provided in the to-be attached member, and the pipe is rotationally connected to the sleeve portion. Further, in order to prevent the pipe from rotating in a reverse direction due to vibration or the like and falling off, an anti-rotation pin is inserted to penetrate a wall thickness of the pipe and the sleeve portion. A pin insertion hole of the sleeve portion through which the pin is inserted is generally formed by a mold that removes outward from an outer periphery of the sleeve portion in a radial direction. One to-be attached member may be provided in a state where a plurality of sleeve portions are close to each other. In such a case, as illustrated in FIGS. 9A and 9B, when a mold 80 forming a pin insertion hole 5 is removed, the molds 80 may interfere with each other, or the mold 80 and the sleeve portion may interfere with each other, and thereby the mold is not established. Therefore, it is necessary to set a disposition of the sleeve portion, a position of the pin insertion hole, and the like in consideration of the case where the mold is removed, the degree of freedom in designing the to-be attached member is reduced, and thereby the design becomes difficult.

In view of the above points, an object of the present invention is to provide a circulating circuit member in which a to-be attached member is able to be easily designed, and a manufacturing method for the circulating circuit member.

Solution to Problem

[1] In order to achieve the above object, the present invention is
a circulating circuit member that forms a part of a circulating circuit through which a fluid flows, including
a pipe;
a to-be attached member that has a sleeve portion made of synthetic resin to which the pipe is rotationally connected; and
a pin that is inserted from the sleeve portion to the pipe, in which a pin insertion hole of the sleeve portion through which the pin is inserted is formed by a mold that is pulled out from an inside of the sleeve portion.

According to the present invention, since the pin insertion hole is formed by the mold that is pulled out from the inside of the sleeve portion, when the mold forming the pin insertion hole is removed, the molds do not interfere with each other, or the mold and the sleeve portion do not interfere with each other. Accordingly, it is not necessary to set the disposition of the sleeve portion, the position of the pin insertion hole, or the like in consideration of the case of removing the mold, and the degree of freedom in designing of the to-be attached member is improved, and thereby the to-be attached member is able to be easily designed.

[2] In addition, in the present invention, an inner wall of the pin insertion hole preferably includes a taper-shaped portion that gradually increases in diameter from an opening edge on an outside of the sleeve portion to an inside of the sleeve portion.

According to such a configuration, since the inner wall of the pin insertion hole is the taper-shaped portion that gradually increases in diameter from the opening edge on the outside of the sleeve portion to the inside of the sleeve portion, the mold is able to be pulled out to a side with a larger inner diameter of the pin insertion hole when being pulled out. Therefore, the mold is easy to pull out, and the pin insertion hole is able to be easily formed by the mold pulled out from the inside of the sleeve portion.

[3] In addition, the present invention is
a circulating circuit member that forms a part of a circulating circuit through which a fluid flows, including
a pipe;
a to-be attached member that has a sleeve portion made of synthetic resin to which the pipe is rotationally connected; and
a pin that is inserted from the sleeve portion to the pipe, in which an inner wall of a pin insertion hole of the sleeve portion through which the pin is inserted includes a taper-shaped portion that gradually increases in diameter from an opening edge on an outside of the sleeve portion to an inside of the sleeve portion.

According to the present invention, since the inner wall of the pin insertion hole is the taper-shaped portion that gradually increases in diameter from the opening edge on the outside of the sleeve portion to the inside of the sleeve portion, the mold is able to be pulled out to the side with the larger inner diameter of the pin insertion hole when being pulled out. Therefore, the mold is easy to pull out, and the pin insertion hole is able to be easily formed by the mold pulled out from the inside of the sleeve portion.

Then, if the pin insertion hole is formed by the mold that is pulled out from the inside of the sleeve portion, when the mold for forming the pin insertion hole is removed, the molds do not interfere with each other, or the mold and the sleeve portion do not interfere with each other. Accordingly, it is not necessary to set the disposition of the sleeve portion, the position of the pin insertion hole, or the like in consideration of the case of removing the mold, and the degree of freedom in designing of the to-be attached member is improved, and thereby the to-be attached member is able to be easily designed.

[4] In addition, in the present invention, the pipe is preferably provided with a claw portion that protrudes outward in a radial direction, an inner peripheral surface of the sleeve portion is preferably provided with a vertical groove portion accepting the claw portion and a horizontal groove portion continuous to the vertical groove portion and extending in a circumferential direction, the claw portion is preferably fitted to the horizontal groove portion to prevent the pipe from falling off from the sleeve portion, and the pin insertion hole is preferably provided to be at the same phase as or an overlapping phase with the vertical groove portion or the horizontal groove portion in a circumferential direction of the sleeve portion.

According to such a configuration, the mold forming the vertical groove portion and the horizontal groove portion, and the mold forming the pin insertion hole are able to be the same mold, and it is possible to simplify a device for manufacturing the circulating circuit member.

[5] In addition, in the present invention, the pin insertion hole is preferably provided to overlap with the vertical groove portion or the horizontal groove portion.

Not only the pin insertion hole is provided to have the same or overlapping phase with the phase of the vertical groove portion or the horizontal groove portion in the circumferential direction, but also the pin insertion hole is actually provided to overlap with the vertical groove portion or the horizontal groove portion, and thereby, it is possible to reduce the size of the mold for forming the vertical groove portion, the horizontal groove portion, and the pin insertion hole.

[6] In addition, in the present invention, the pin is preferably formed in a C-shaped cross section by curving a thin plate into a cylindrical shape.

According to such a configuration, when the pin is inserted into the pin insertion hole, the diameter of the pin is reduced so that the pin is able to be inserted without resistance. Therefore, it is possible to easily insert the pin and easily perform a connection operation of the pipe.

[7] In addition, the present invention is a manufacturing method for a circulating circuit member that forms a part of a circulating circuit through which a fluid flows, the circulating circuit member including a pipe;

a to-be attached member that has a sleeve portion made of synthetic resin to which the pipe is rotationally connected; and a pin that is inserted from the sleeve portion to the pipe, in which a pin insertion hole of the sleeve portion through which the pin is inserted is formed by a mold that is pulled out from an inside of the sleeve portion.

According to the present invention, since the pin insertion hole is formed by the mold that is pulled out from the inside of the sleeve portion, when the mold forming the pin insertion hole is removed, the molds do not interfere with each other, or the mold and the sleeve portion do not interfere with each other. Accordingly, it is not necessary to set the disposition of the sleeve portion, the position of the pin insertion hole, or the like in consideration of the case of removing the mold, and the degree of freedom in designing of the to-be attached member is improved, and thereby the to-be attached member is able to be easily designed.

DESCRIPTION OF EMBODIMENTS

A circulating circuit member and a manufacturing method for the same according to a first embodiment of the present invention will be described with reference to drawings.

Figure 1:
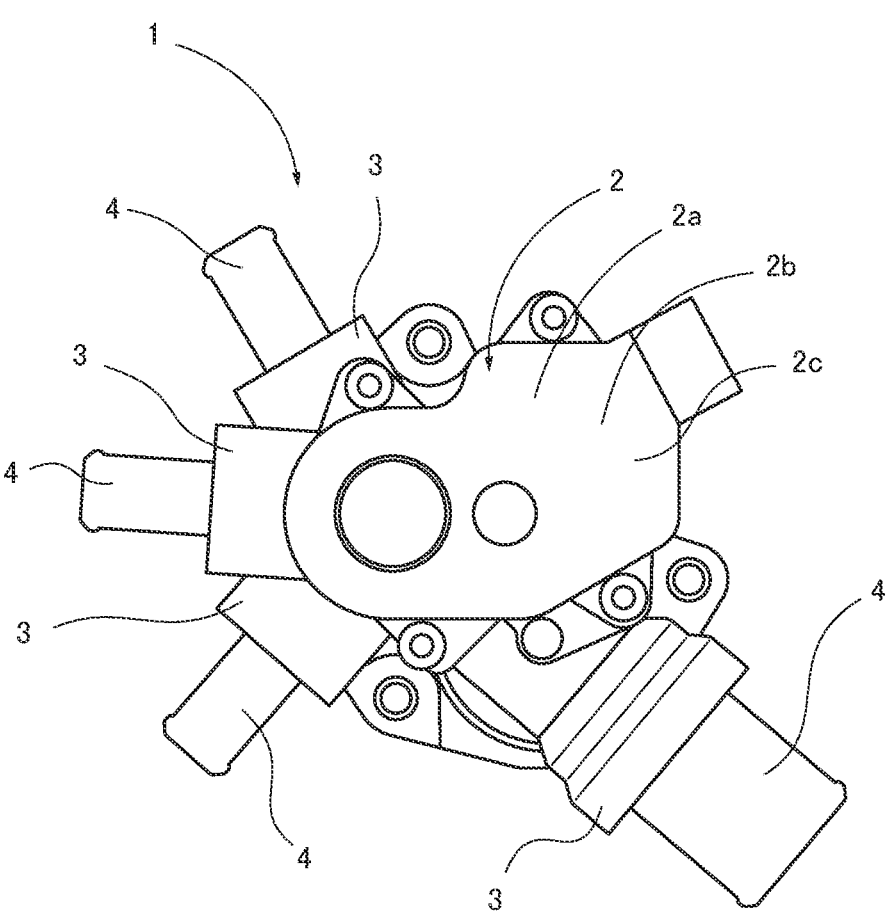
FIG. 1 is a plan view illustrating a circulating circuit member according to a first embodiment of the present invention.

With reference to FIG. 1, a circulating circuit member 1 of the first embodiment includes a valve device 2 as a to-be attached member and a pipe 4 connected to the valve device 2. The valve device 2 and the pipe 4 constitute a part of a circulating circuit that circulates a fluid (gas and liquid (water, cooling liquid, oil, or the like)) for cooling or warming up.

Figure 6:
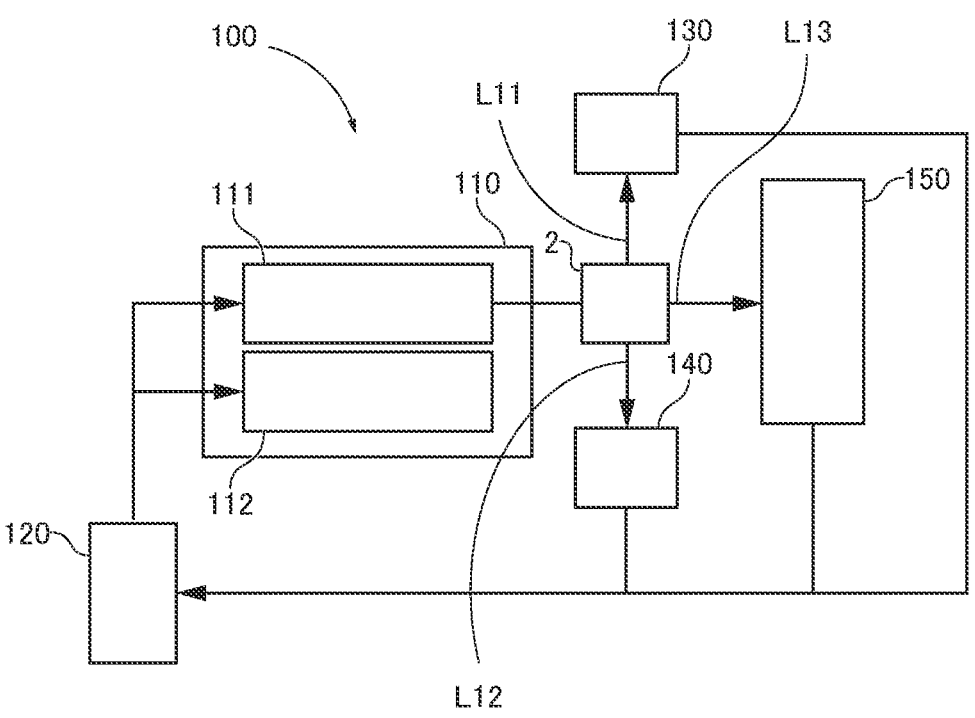
FIG. 6 is an explanatory view schematically illustrating an example of a circulating circuit in which the circulating circuit member of the first embodiment is used.

With reference to FIG. 6, an example of the circulating circuit 100 provided with the circulating circuit member 1 of the first embodiment will be described. The circulating circuit 100 is a circuit in which cooling water for an automobile is circulated. The circulating circuit 100 includes the valve device 2, a water pump 120, a heating heat exchanger 130, an oil cooler 140, and a radiator 150. The valve device 2 distributes the cooling water (fluid) that is pressurized by the water pump 120 and passes through a water jacket of an internal combustion engine 110 to each side of the heating heat exchanger 130, the oil cooler 140, and the radiator 150 via first to third pipes L11 to L13.

Figure 2:
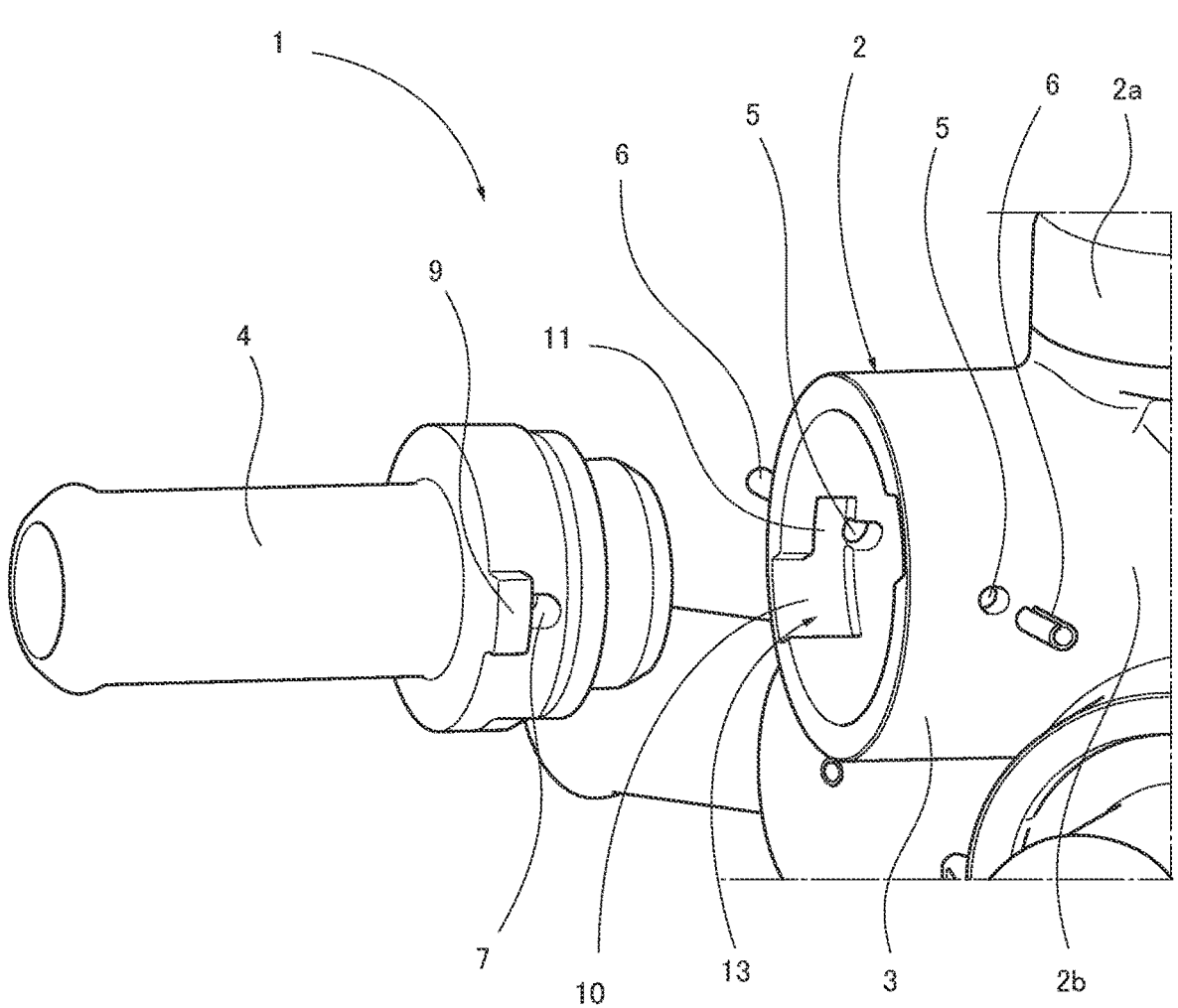
FIG. 2 is an enlarged perspective view illustrating a state where the circulating circuit member of the first embodiment is disassembled.

With reference to FIGS. 1 and 2, the circulating circuit member 1 includes the valve device 2, the pipe 4 which is bayonet-coupled to a sleeve portion 3 of the valve device 2, which will be described later, and an anti-rotation pin 6 that penetrates a wall thickness of the sleeve portion 3 and the pipe 4. The sleeve portion 3 is provided at three locations of the valve device 2 and the pipe 4 is connected to each of the sleeve portions 3, and thereby the rotation thereof is prevented by the pin 6. Each of the pipes 4 constitutes a part of any one of the first to third pipes L11 to L13.

The valve device 2 includes a housing 2*a*, a valve body (not illustrated) that is rotatably provided in the housing 2*a*, and a motor 2*c* that rotationally drives the valve body. A flow rate of the fluid flowing out from the housing 2*a* to each of the pipes 4 is controlled by controlling the rotation of the valve body by a control device (not illustrated).

The housing 2*a* is made of synthetic resin and includes a housing main body 2*b* that accommodates the valve body inside, and the sleeve portion 3 that is provided integrally with the housing main body 2*b* to protrude outward from the housing main body 2*b*. The sleeve portion 3 is formed with an engagement groove 13 for bayonet-coupling to the pipe 4 and a pin insertion hole 5 for inserting the pin 6.

In the sleeve portion 3 and the engagement groove 13, a direction along a central axis of the sleeve portion 3 is referred to an axial direction, and a direction along a circumferential direction of the sleeve portion 3 is referred to a circumferential direction. In the engagement groove 13, a tip side of the sleeve portion 3 is an opening side, and a housing main body 2*b* side, which is the opposite side to the opening side, is a deep portion side. The engagement grooves 13 are provided at two locations on an inner periphery of the tip portion of the sleeve portion 3 at equal intervals. With reference to FIG. 2, each of the engagement grooves 13 has a substantially L-shape when viewed from the inside of the sleeve portion 3 in the radial direction, and has a vertical groove portion 10 that extends from the tip of the sleeve portion 3 to the deep portion side in the axial direction and a horizontal groove portion 11 that extends from a deep portion side end of the vertical groove portion 10 to one side in the circumferential direction. The pin insertion hole 5 is formed to slightly overlap with an end of the horizontal groove portion 11 on the deep portion side.

The pipe 4 has a claw portion 9 for being bayonet-coupled to the sleeve portion 3. The claw portions 9 are provided at two locations on the outer periphery of the pipe 4 at equal intervals to protrude outward in the radial direction. A width of each of the claw portions 9 in the circumferential direction of the pipe 4 is the same as or slightly smaller than a width of the vertical groove portion 10 in the circumferential direction. A thickness of each of the claw portions 9 in the axial direction of the pipe 4 is the same as or slightly smaller than a length of the horizontal groove portion 11 in the axial direction. The claw portion 9 is movable from the end of the vertical groove portion 10 on the opening side to the deep portion side, and is movable from the end portion of the vertical groove portion 10 on the deep portion side into the horizontal groove portion 11. The state where the claw portion 9 is inserted into the horizontal groove portion 11 is the bayonet-coupled state, and at this time, the pipe 4 is prevented from falling off from the sleeve portion 3. In a state of being bayonet-coupled to the sleeve portion 3, the pipe 4 is formed with a fitting portion 7 into which the tip of the pin 6 is fitted at a position facing the pin insertion hole 5.

Figure 5:
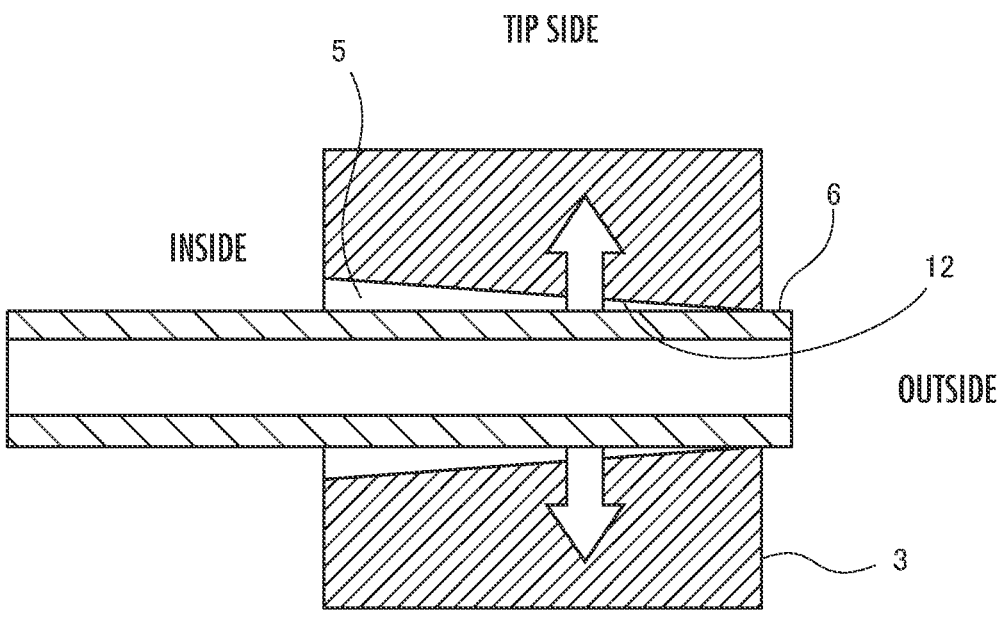
FIG. 5 is an explanatory view for describing a state where a pin is inserted into the pin insertion hole of the first embodiment.

With reference to FIGS. 2 and 5, the pin 6 is a spring pin and is formed by curving a thin metal plate into a cylindrical shape. As a result, the pin 6 has a C-shaped cross section and is able to reduce a diameter, and in a case of reducing the diameter, the pin 6 tends to be restored to the original diameter by its own elasticity.

Next, a method for connecting the pipe 4 in the circulating circuit member 1 of the first embodiment and the valve device 2 which is a to-be attached member of the pipe 4 will be described.

First, an operator inserts the pipe 4 into the sleeve portion 3 in a state where the claw portion 9 of the pipe 4 is faced with the end of the sleeve portion 3 on the opening side of the vertical groove portion 10. When the claw portion 9 reaches the connecting portion between the vertical groove portion 10 and the horizontal groove portion 11, the pipe 4 is rotated and the claw portion 9 is slid into the horizontal groove portion 11. Next, the operator inserts the pin 6 from the outside of the sleeve portion 3 into the pin insertion hole 5 in a state where the diameter of the pin 6 is reduced. When the tip of the pin 6 reaches the inside of the fitting portion 7, the hand is released from the pin 6. As a result, the diameter of the pin 6 is increased by its own elastic recovering force, and the pin 6 is fitted into the pin insertion hole 5 and the fitting portion 7 without rattling. Of course, the connection operation of the pipe 4 does not have to be done by the operator, but is able to be done by a work device.

Subsequently, in the circulating circuit member 1 of the first embodiment, a manufacturing method for the valve device 2, which is a to-be attached member of the pipe 4, will be described.

Figure 3:
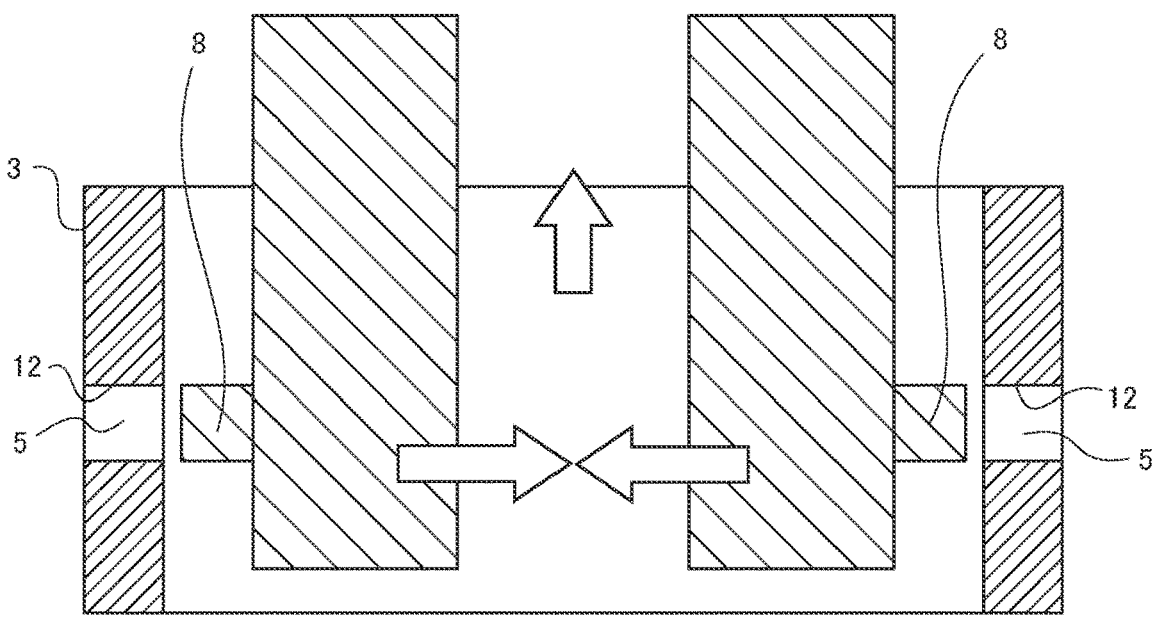
FIG. 3 is a sectional view schematically illustrating a manufacturing method for the circulating circuit member according to the first embodiment.
Figure 4:
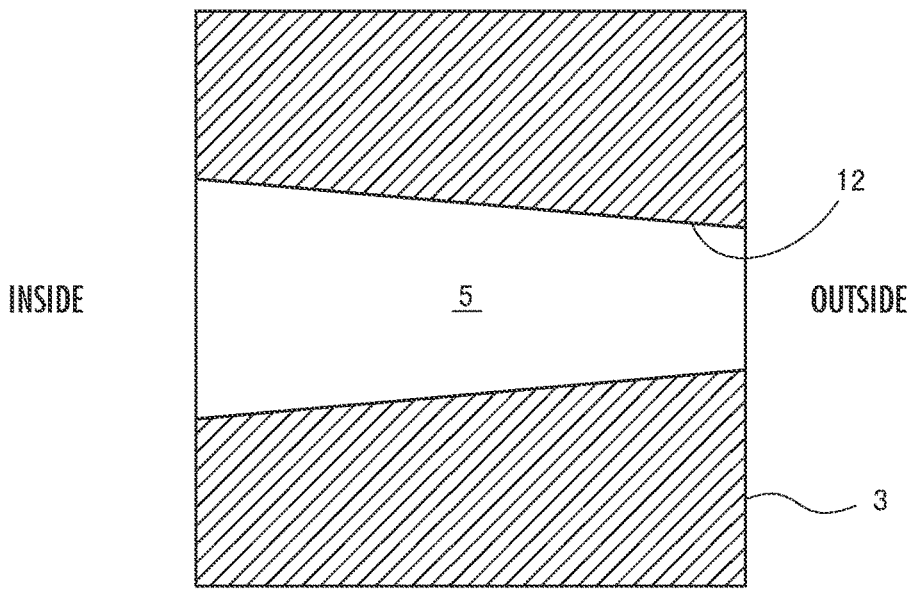
FIG. 4 is an explanatory view for describing a shape of a pin insertion hole in the first embodiment.

As schematically illustrated in FIG. 3, the pin insertion hole 5 is formed by a mold 8 which is pulled out from the inside of the sleeve portion 3. In FIG. 3, a mold to form the sleeve portion 3 or the housing main body 2*b* other than the pin insertion hole 5 is omitted. A wall portion defining the pin insertion hole 5 is referred to as an inner wall 12 of the pin insertion hole 5. The inner wall 12 of the pin insertion hole 5 is a taper-shaped portion that gradually increases in diameter from an opening edge on the outside of the sleeve portion 3 to the inside of the sleeve portion 3. Although the tapered shape is exaggerated in FIG. 4 to make the shape of the pin insertion hole 5 easy to understand, in practice, the taper-shaped portion may be formed such that a taper angle is 10 degrees or less.

In a case where the inner wall 12 of the pin insertion hole 5 is the taper-shaped portion as described above, an angle formed by an outer peripheral surface of the sleeve portion 3 and the inner wall 12 of the pin insertion hole 5 is less than 90 degrees. Further, in a case where the pin insertion hole 5 is formed by the mold 8 pulled out from the inside of the sleeve portion 3, a chamfered portion having a curved shape or a tapered shape is not able to be formed on the opening edge of the pin insertion hole 5 on the outside. Therefore, in a case where the pin insertion hole 5 is formed by the mold 8 pulled out from the inside of the sleeve portion 3, a shape of a boundary portion between the outer peripheral surface of the sleeve portion 3 and the inner wall 12 of the pin insertion hole 5 becomes a sharp edge shape. After the mold 8 is pulled out, the chamfered portion having a curved shape or a tapered shape may be formed on the opening edge of the pin insertion hole 5 on the outside.

As described above, the circulating circuit member 1 according to the first embodiment is the circulating circuit member 1 that forms a part of the circulating circuit 100 through which the fluid flows, and includes the pipe 4, the valve device 2 (to-be attached member) that has the sleeve portion 3 made of synthetic resin to which the pipe 4 is rotationally connected, and the pin 6 that is inserted from the sleeve portion 3 to the pipe 4. The inner wall 12 of the pin insertion hole 5 of the sleeve portion 3 through which the pin 6 is inserted has a taper-shaped portion that gradually increases in diameter from the opening edge on the outside of the sleeve portion 3 to the inside of the sleeve portion 3.

According to the above-described configuration, the pin insertion hole 5 is able to be formed by the mold 8 which is pulled out from the inside of the sleeve portion 3. In this manner, when the mold 8 forming the pin insertion hole 5 is removed, the molds 8 do not interfere with each other, or the mold 8 and the sleeve portion 3 do not interfere with each other. That is, it is not necessary to set the disposition of the sleeve portion 3, the position of the pin insertion hole 5, or the like in consideration of the case of removing the mold as in the related art, and the degree of freedom in designing of the valve device 2 (to-be attached member) is improved, and thereby the valve device 2 is able to be easily designed.

Figure 7:
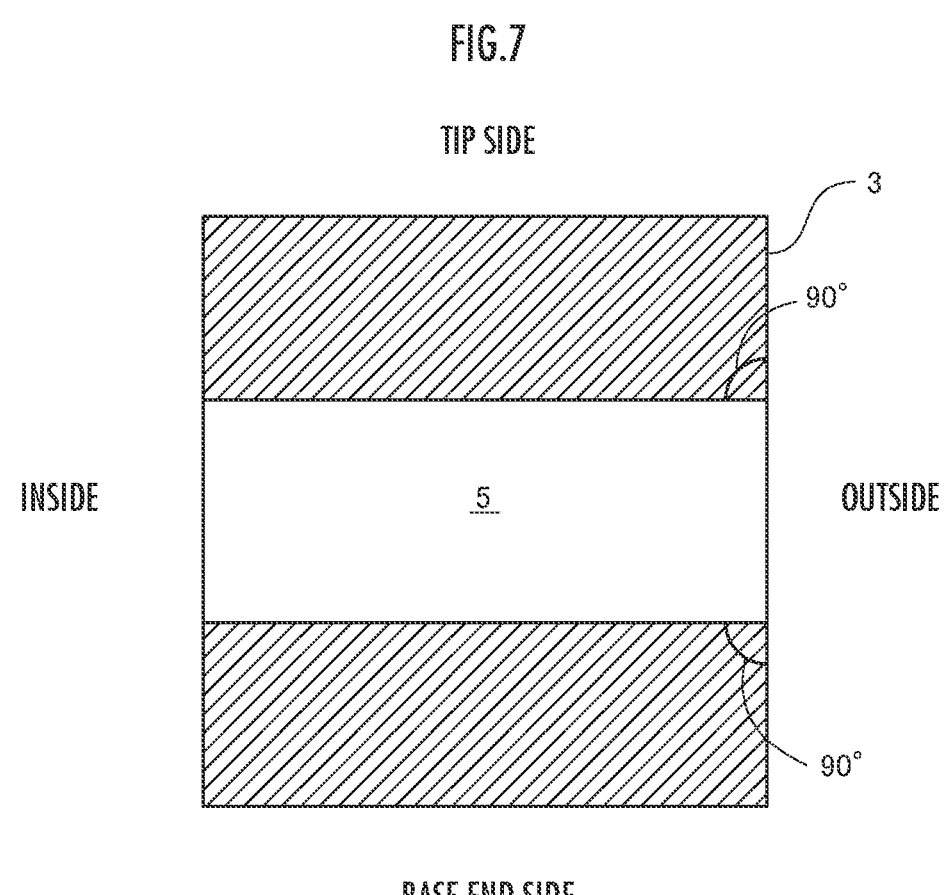
FIG. 7 is a sectional view schematically illustrating another example of the pin insertion hole according to the first embodiment of the present invention.

Furthermore, according to the above-described configuration, since the inner wall 12 of the pin insertion hole 5 is the taper-shaped portion that gradually increases in diameter from the opening edge on the outside of the sleeve portion 3 to the inside of the sleeve portion 3, the mold 8 is able to be pulled out to the side with the larger inner diameter of the pin insertion hole 5 when being pulled out. Therefore, the mold 8 is easy to pull out, and the pin insertion hole 5 is able to be easily formed by the mold 8 pulled out from the inside of the sleeve portion 3. The inner wall 12 may have a straight shape as illustrated in FIG. 7 and may not have the taper-shaped portion as long as the pin insertion hole 5 is formed by the mold 8 pulled out from the inside of the sleeve portion 3.

In addition, with reference to FIG. 2, the pipe 4 in the first embodiment is provided with a plurality of claw portions 9 that protrude outward in the radial direction. The inner peripheral surface of the sleeve portion 3 is provided with a plurality of the vertical groove portions 10 extending in a central axis direction of the sleeve portion 3 such that the claw portions 9 are able to be accepted, and the horizontal groove portions 11 continuous to the vertical groove portions 10 and extending in the circumferential direction of the sleeve portion 3. The fitting of the claw portion 9 to the horizontal groove portion 11 prevents the pipe 4 from falling off from the sleeve portion 3. Further, a configuration is provided such that the pipe 4 is prevented from rotating with respect to the sleeve portion 3, and fitting of the claw portion 9 into the horizontal groove portion 11 is not released by fitting the tip of the pin 6 inserted into the pin insertion hole 5 into the fitting portion 7 provided in the pipe 4.

As described above, the pipe 4 and the sleeve portion 3 are able to be bayonet-coupled by forming the claw portion 9, and the engagement groove 13 having the vertical groove portion 10 and the horizontal groove portion 11. According to the configuration, when the pipe 4 and the sleeve portion 3 are rotationally connected, the connection is possible with a small amount of rotation as compared with screwing or the like. Therefore, the connection operation of the pipe 4 is able to be easily performed.

In addition, in the circulating circuit member 1 according to the first embodiment, the pin insertion hole 5 is provided to have the same phase as or an overlapping phase with the vertical groove portion 10 or the horizontal groove portion 11 of the sleeve portion 3 in the circumferential direction. In other words, the pin insertion hole 5 and the vertical groove portion 10 or the horizontal groove portion 11 are formed such that a shadow of the pin insertion hole 5 overlaps with at least a part of the vertical groove portion 10 or the horizontal groove portion 11 when being projected from the one end side of the sleeve portion 3 in the central axis direction.

According to the above-described configuration, the mold 8 forming the vertical groove portion 10 and the horizontal groove portion 11, and the mold 8 forming the pin insertion hole 5 are able to be the same mold, and it is possible to simplify a manufacturing device for manufacturing the circulating circuit member 1 as compared with a case of being formed by each mold.

More specifically, the pin insertion hole 5 of the present embodiment is provided to partially overlap with the horizontal groove portion 11. With such a configuration, it is possible to reduce the size of the mold 8 as compared with a case where the pin insertion hole 5 and the horizontal groove portion 11 are disposed with an interval in the axial direction of the sleeve portion 3. The pin insertion hole 5 may be provided to overlap with the vertical groove portion 10. Further, the pin insertion hole 5 may be formed to be completely inside the horizontal groove portion 11. In this case, since the fitting portion 7 is able to be formed in the claw portion 9, the strength decrease of the pipe 4 due to the fitting portion 7 being provided is able to be suppressed, it is possible to reduce a required amount of strength measures for the fitting portion 7 such as increasing the wall thickness of the pipe 4.

In the first embodiment, although a case is described in which two each of the claw portion 9, the engagement groove 13, the pin insertion hole 5, the fitting portion 7, and the pin 5 are provided, of course, the number of these is not limited to two, but may be three or more, and is able to be changed as appropriate. Further, although the pipe 4 and the sleeve portion 3 are bayonet-coupled, a rotation connection method other than the bayonet-coupling, such as screwing, or the like may be adopted. In a case where the pipe 4 and the sleeve portion 3 are rotationally connected by screwing, for example, a male screw is formed on the outer peripheral surface of the pipe 4 and a female screw is formed on the inner peripheral surface of the sleeve portion 3, and thereby screwing is able to be done.

In addition, the pin 6 of the first embodiment is formed by curving a thin plate into a cylindrical shape. As described above, the pin 6 is a spring pin that has a C-shaped cross section and is able to be reduced in diameter, and is elastic. According to the configuration, when the operator or the work device inserts the pin 6 into the pin insertion hole 5 or the fitting portion 7, the diameter of the pin 6 is reduced so that the pin 6 is able to be inserted without resistance. Therefore, it is possible to easily insert the pin 6 and easily perform the connection operation of the pipe 4.

Here, in a case where the hole is formed by the mold, in order to make it easy to pull out the mold, the hole is made into a tapered shape and the mold is pulled out to the side having a larger diameter. In the first embodiment, by applying this to the pin insertion hole 5, the pin 6 is used as a spring pin. As a result, as illustrated in FIG. 5, the pin 6 whose diameter is to be increased by its own restoring force is able to be pressed by the opening edge of the small-diameter pin insertion hole 5 on the outside, and the pin 6 is able to be prevented from being pulled out. In a case where the pin 6 is pulled out from the pin insertion hole 5, it is necessary to reduce the diameter of the pin 6 again.

Even in a case where a part of the inner wall 12 of the pin insertion hole 5 is the taper-shaped portion, the same effect is able to be obtained by using the pin 6 as the spring pin. In addition, the pin 6 does not need to be the spring pin, and may be a cylindrical or columnar pin. Furthermore, as described above, the inner wall 12 of the pin insertion hole 5 may have the straight shape.

Figure 8:
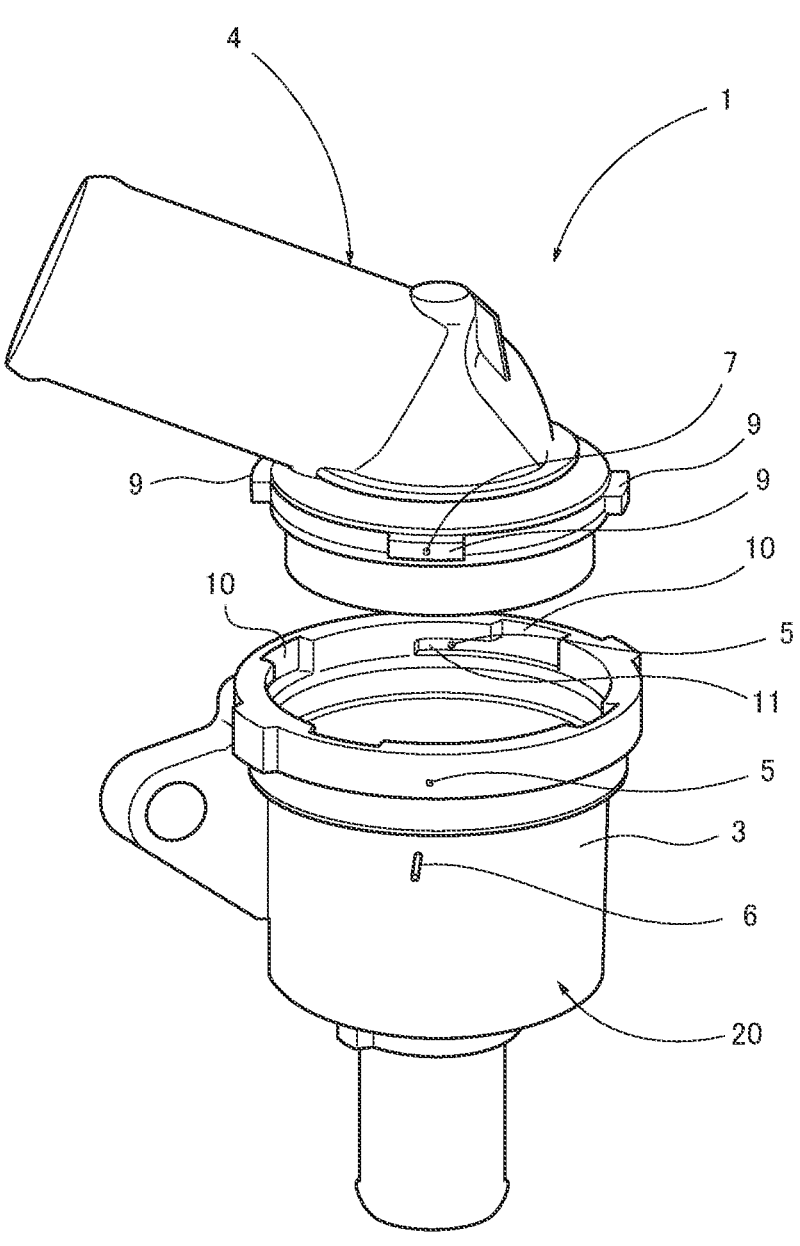
FIG. 8 is a perspective view illustrating a circulating circuit member according to a second embodiment of the present invention.
Figure 9A:
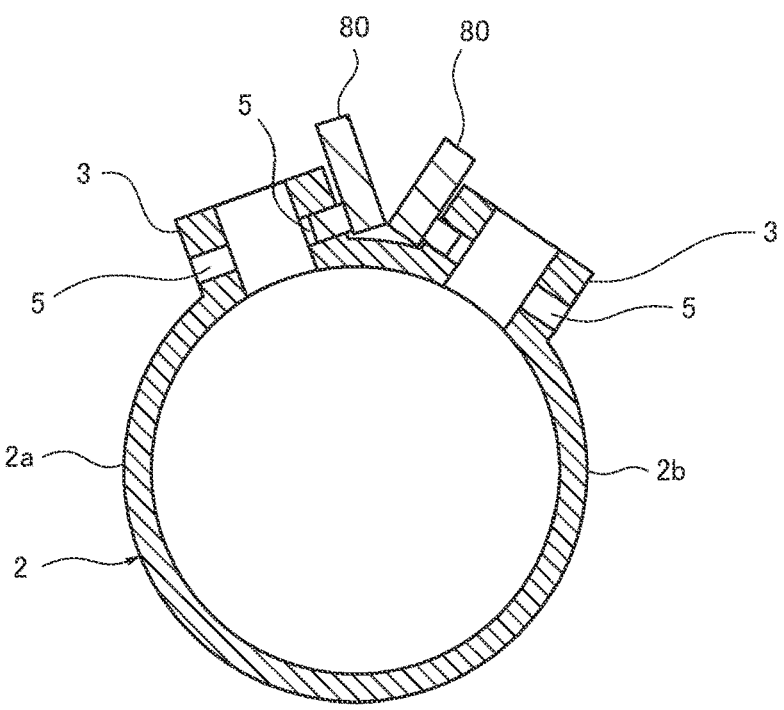
FIG. 9A is a sectional view schematically illustrating a manufacturing method for a circulating circuit member in the related art.
Figure 9B:
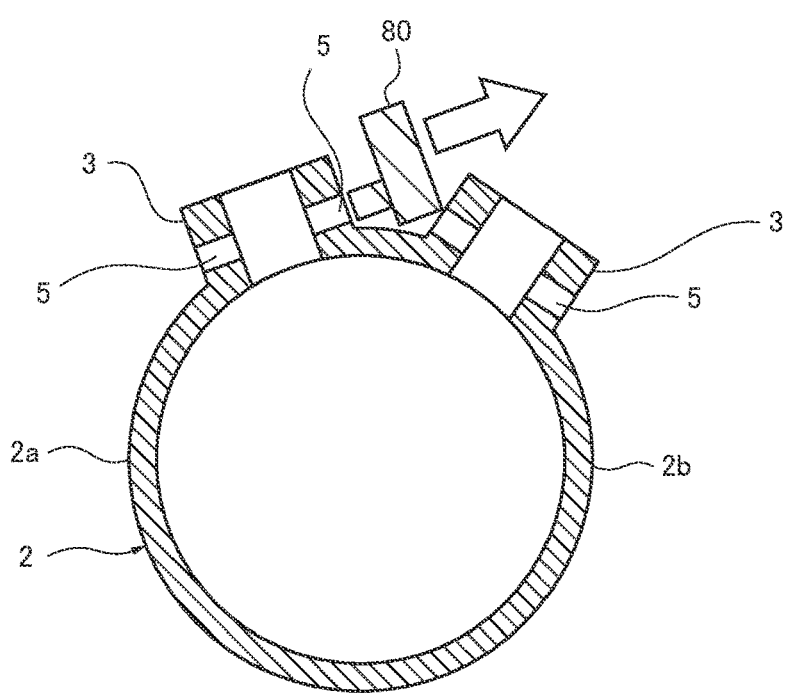
FIG. 9B is an explanatory view schematically illustrating the manufacturing method for the circulating circuit member in the related art.

In addition, in the first embodiment, the valve device 2 is described as the to-be attached member of the pipe 4, but the to-be attached member is not limited to the valve device 2 and may be another component constituting the circulating circuit 100. For example, as illustrated in FIG. 8, in a circulating circuit member 1 of a second embodiment of the invention, a to-be attached member may be a thermostat 20. In the second embodiment, the same or corresponding configurations as those in the first embodiment are denoted by the same reference numerals and detailed description thereof will be omitted. In the second embodiment, one sleeve portion 3 is provided for one to-be attached member. In this way, the number of sleeve portions with respect to the to-be attached member is able to be appropriately changed.

The present invention can also be used for an electric automobile or a fuel cell vehicle. As described above, the present invention is able to be modified and changed without departing from the claims.

DESCRIPTION OF REFERENCE NUMERALS

1: circulating circuit member
2: valve device (to-be attached member)
2*a*: housing
2*b*: housing main body
2*c*: motor
3: sleeve portion
4: pipe
5: pin insertion hole
6: pin
7: fitting portion
8: mold
9: claw portion
10: vertical groove portion
11: horizontal groove portion
12: inner wall
13: engagement groove
20: thermostat
100: circulating circuit
110: internal combustion engine
111: cylinder head
112: cylinder block
120: water pump
130: heating heat exchanger
140: oil cooler
150: radiator
L11 to L13: first to third pipes

The invention claimed is:

1. A circulating circuit member that forms a part of a circulating circuit through which a fluid flows, comprising:
a pipe;
a to-be attached member that has a sleeve portion made of synthetic resin to which the pipe is rotationally connected; and
a pin that is inserted from the sleeve portion to the pipe, wherein a pin insertion hole of the sleeve portion through which the pin is inserted is formed by a mold that is pulled out from an inside of the sleeve portion;
wherein the pin is formed in a C-shaped cross section by curving a thin plate into a cylindrical shape; and
wherein an inner wall of the pin insertion hole includes a taper-shaped portion that gradually increases in diameter from an opening edge on an outside of the sleeve portion to the inside of the sleeve portion.

2. The circulating circuit member according to claim 1, wherein
the pipe is provided with a claw portion that protrudes outward in a radial direction,
an inner peripheral surface of the sleeve portion is provided with a vertical groove portion accepting the claw portion and a horizontal groove portion continuous to the vertical groove portion and extending in a circumferential direction,
the claw portion is fitted to the horizontal groove portion to prevent the pipe from falling off from the sleeve portion, and
the pin insertion hole is provided at the same phase as or an overlapping phase with the vertical groove portion or the horizontal groove portion in a circumferential direction of the sleeve portion.

3. The circulating circuit member according to claim 2, wherein the pin insertion hole is provided to overlap with the vertical groove portion or the horizontal groove portion.

4. A circulating circuit member that forms a part of a circulating circuit through which a fluid flows, comprising:
a pipe;
a to-be attached member that has a sleeve portion made of synthetic resin to which the pipe is rotationally connected; and
a pin that is inserted from the sleeve portion to the pipe, wherein an inner wall of a pin insertion hole of the sleeve portion through which the pin is inserted includes a taper-shaped portion that gradually increases in diameter from an opening edge on an outside of the sleeve portion to an inside of the sleeve portion; and
wherein the pipe is provided with a claw portion that protrudes outward in a radial direction,
an inner peripheral surface of the sleeve portion is provided with a vertical groove portion accepting the claw portion and a horizontal groove portion continuous to the vertical groove portion and extending in a circumferential direction,
the claw portion is fitted to the horizontal groove portion to prevent the pipe from falling off from the sleeve portion, and
the pin insertion hole is provided at the same phase as or an overlapping phase with the vertical groove portion or the horizontal groove portion in a circumferential direction of the sleeve portion.

5. The circulating circuit member according to claim 4, wherein
the pin insertion hole is provided to overlap with the vertical groove portion or the horizontal groove portion.

6. A circulating circuit member that forms a part of a circulating circuit through which a fluid flows, comprising:
a pipe;
a to-be attached member that has a sleeve portion made of synthetic resin to which the pipe is rotationally connected; and
a pin that is inserted from the sleeve portion to the pipe, wherein an inner wall of a pin insertion hole of the sleeve portion through which the pin is inserted includes a taper-shaped portion that gradually increases in diameter from an opening edge on an outside of the sleeve portion to an inside of the sleeve portion; and
wherein the pin is formed in a C-shaped cross section by curving a thin plate into a cylindrical shape.

* * * * *